United States Patent [19]

Gulczynski

[11] Patent Number: 4,736,286
[45] Date of Patent: Apr. 5, 1988

[54] SWITCHING POWER SUPPLY

[76] Inventor: Zdzislaw Gulczynski, P.O. Box 441, Medford, Mass. 01890

[21] Appl. No.: 936,293

[22] Filed: Dec. 2, 1986

[30] Foreign Application Priority Data

Dec. 3, 1985 [DE] Fed. Rep. of Germany ....... 3542730
Mar. 3, 1986 [DE] Fed. Rep. of Germany ....... 3606896

[51] Int. Cl.$^4$ ............................................. H02M 3/22
[52] U.S. Cl. .......................................... 363/70; 363/15
[58] Field of Search ................. 363/15, 49, 69, 70, 363/39, 44, 45, 46, 47, 48; 323/908, 282

[56] References Cited

FOREIGN PATENT DOCUMENTS

| 1007861 | 5/1957 | Fed. Rep. of Germany | ........ 363/70 |
| 1638146 | 1/1979 | Fed. Rep. of Germany | ........ 363/70 |
| 0826315 | 5/1981 | U.S.S.R. | ................. 363/49 |
| 0993415 | 1/1983 | U.S.S.R. | ................. 363/49 |
| 1065846 | 1/1984 | U.S.S.R. | ................. 363/70 |

Primary Examiner—Patrick R. Salce
Assistant Examiner—Judson H. Jones

[57] ABSTRACT

The invention relates to switching power supplies receiving AC line voltage or DC voltage, particularly for highly efficient regulators operating at high switching frequency. The power supplies contain at least two switches being switched independently of each other; their individual parts can even oscillate autonomously. The energy is stored in at least one capacitor charged by high frequency current pulses. The discharging is independent of the user and also when the output resistance of the line is high so that the output ripple is very low, no minimum load is required and the power failure protection is inherent. The input current of the power supply is uninterrupted. Furthermore, there are no surge currents and any voltage spikes are eliminated; no snubbers are required. EMI/RFI are extremely low. Thyristors and triacs can be employed as they can be turned off by one of the remaining switches. The switching power is actually also an operative power amplifier with an extremely short response time. The load, in this case a loudspeaker with an LC-network connected prior thereto, can be coupled directly to the output of the power supply.

23 Claims, 6 Drawing Sheets

SWITCHING POWER SUPPLY

BACKGROUND OF THE INVENTION

The invention generally relates to switching power supplies receiving AC line voltage or DC voltage, particularly for highly efficient regulators operating at high switching frequency.

Switching power supplies are generally electrical energy regulators which change electrical signals from one form to another by the use of high speed switching components.

The disadvantages of conventional switching power supplies are many. They typically include a very complex structure in spite of the use of integrated circuits. The primary current of a power transformer is, on principle, periodically interrupted resulting in high voltage spikes and EMI/RFI distortions. The charging of an input capacitor causes enormous inrush currents occurring at line overvoltage spikes, and especially while turning the power on. The input rectifier must be considerably oversized. Numerous interference suppressors and protection circuits are inevitable.

SUMMARY OF THE INVENTION

Accordingly, the present invention is intended to provide a switching power supply having a very low number of components, short response time, very high reliability and efficiency as well as an extremely low EMI/RFI level.

The power supply includes a pair of switching converter means, A and B, operable independently of each other and each having input, reference and output terminals with the input terminals thereof both being coupled to receive the AC or DC signal, the reference terminals of the converters A and B being connected respectively to the output terminal of the converter B and ground, and two capacitors, each connected between the output terminal of a separate converter and ground with the output terminal of at least one of the converters providing the output signal of the power supply.

Further, embodiments take advantage of the use of multiple independent switches and solve the problem of the overlapping of conduction phases. Consequently, there are no requirements on the symmetry of a control circuitry and the individual parts of the circuit can even oscillate autonomously. No overvoltage spikes and no surge currents are expected; the reliability is very high. No minimum load is required. Finally, thyristors and triacs can be employed.

BRIEF DESCRIPTION OF THE DRAWINGS

The present invention will become more clear in conjunction with the accompanying figures of which.

and

Figure 2:
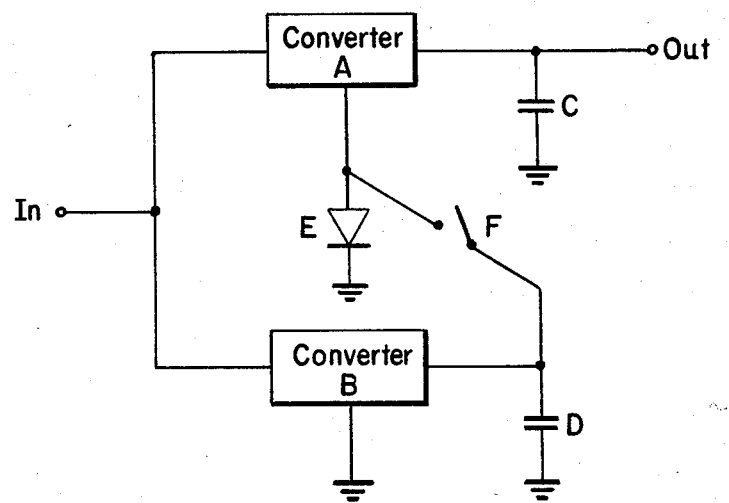
FIG. 2 is another embodiment.
Figure 4:
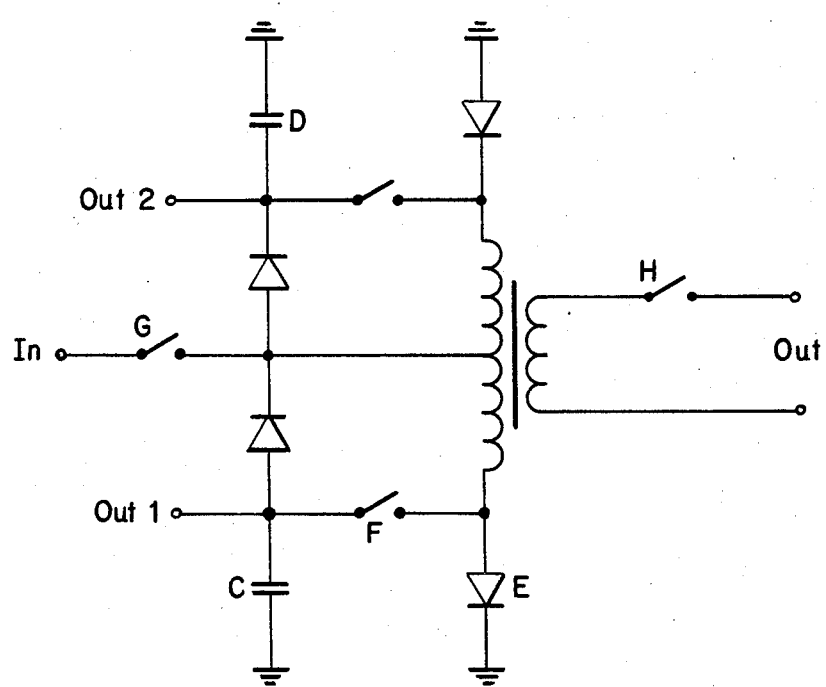
FIG. 4 is a version with two flyback converters having common nodes tied together, and based on FIG. 2b.
Figure 4A:
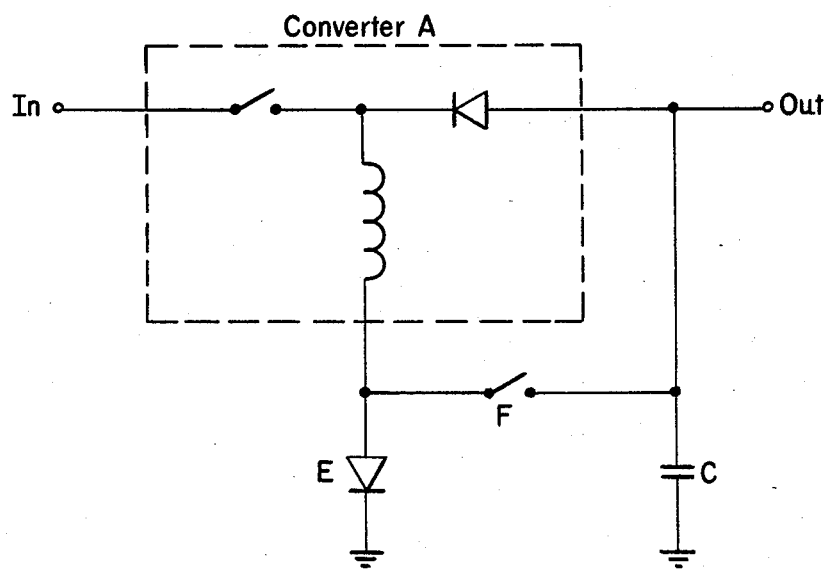

FIG. 4a is an embodiment, based on FIG. 2, with sole flyback converter A and the switch F coupled to the output thereof.

DETAILED DESCRIPTION OF THE INVENTION

For the purpose of the present application the term converter refers to a device having three terminals, consisting of three components, and being employed for the conversion of a predetermined DC input voltage into the required DC output voltage. Assuming a positive input voltage the three components are connected to input, reference and output terminals in the following order, respectively:

an inductor, a switch and the cathode of a diode in case of boost converter, a switch, an inductor and the anode of a diode in case of flyback converter.

Figure 1:
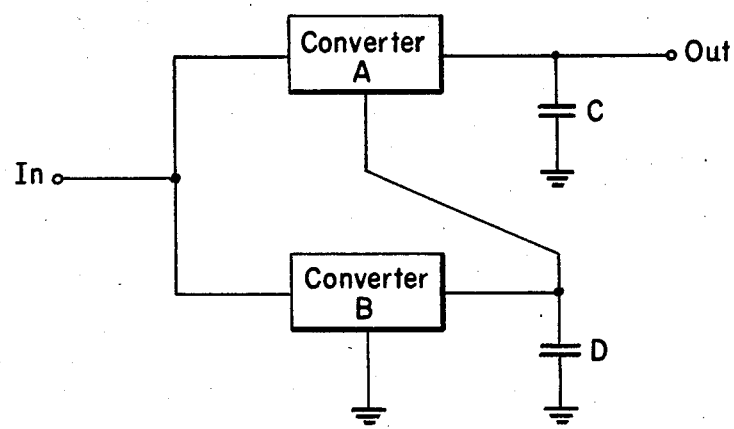
FIG. 1 is a first embodiment of the invention.

The switching power supply in FIG. 1 employs two converters; A and B, and can be supplied directly from AC line voltage. Four combinations are possible: two boost, two flyback or one boost and one flyback converters can be employed. The capacitors C and D are connected to the outputs of the converters A and B respectively. The load can be coupled to one output or between the outputs. The output provided by the converter A is shown.

The mode of operation is to be explained on the example of the switching power supply with two boost converters. The version is especially advantageous due to its uninterrupted input current.

The switch of the converter A is being switched on and off until the rising output voltage has reached a required value; the peak current of the switch can also be considered. The purpose of the converter B is to produce a negative capacitor voltage so that the voltage difference between the voltage and a momentary value of the line voltage is always negative; thus it is always possible to charge the output capacitor C.

Figure 1A:
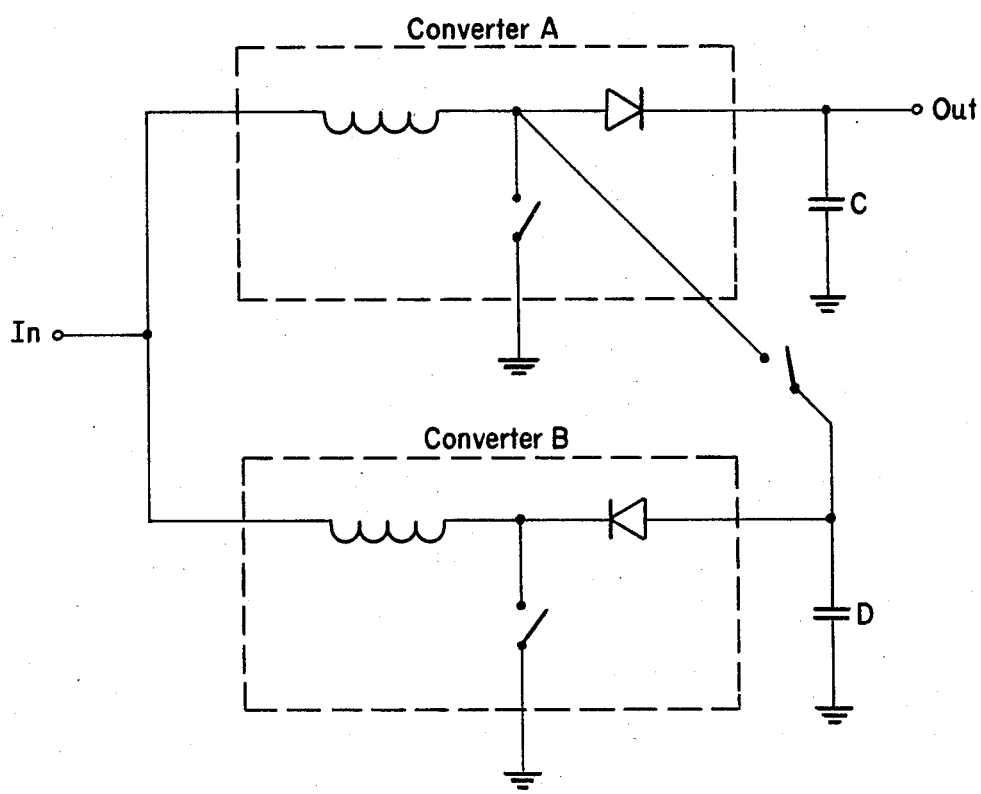
FIG. 1a is an embodiment, based on FIG. 1, with two boost converters and an additional switch.

The switch of the converter B is connected to ground; the capacitor D can be charged only during negative half-waves of the line voltage. When the switch of the converter A is connected to ground rather than the output of converter B and switched during positive half-waves of the line voltage and an additional switch is connected between the common node of the components of the converter A and the output of the converter B, as shown in FIG. 1a, then the load of the capacitor D is approximately halved.

The same can be achieved through a serial connection of the above switches. An example is embodied in FIG. 2. The switch F is opened at positive half-waves, or more accurate, when the line voltage is above a positive threshold; the current flows through the diode E. The switch is closed if the line voltage is below the threshold; the diode is cut off. The switch of the converter A is being switched in both cases.

Figure 2A:
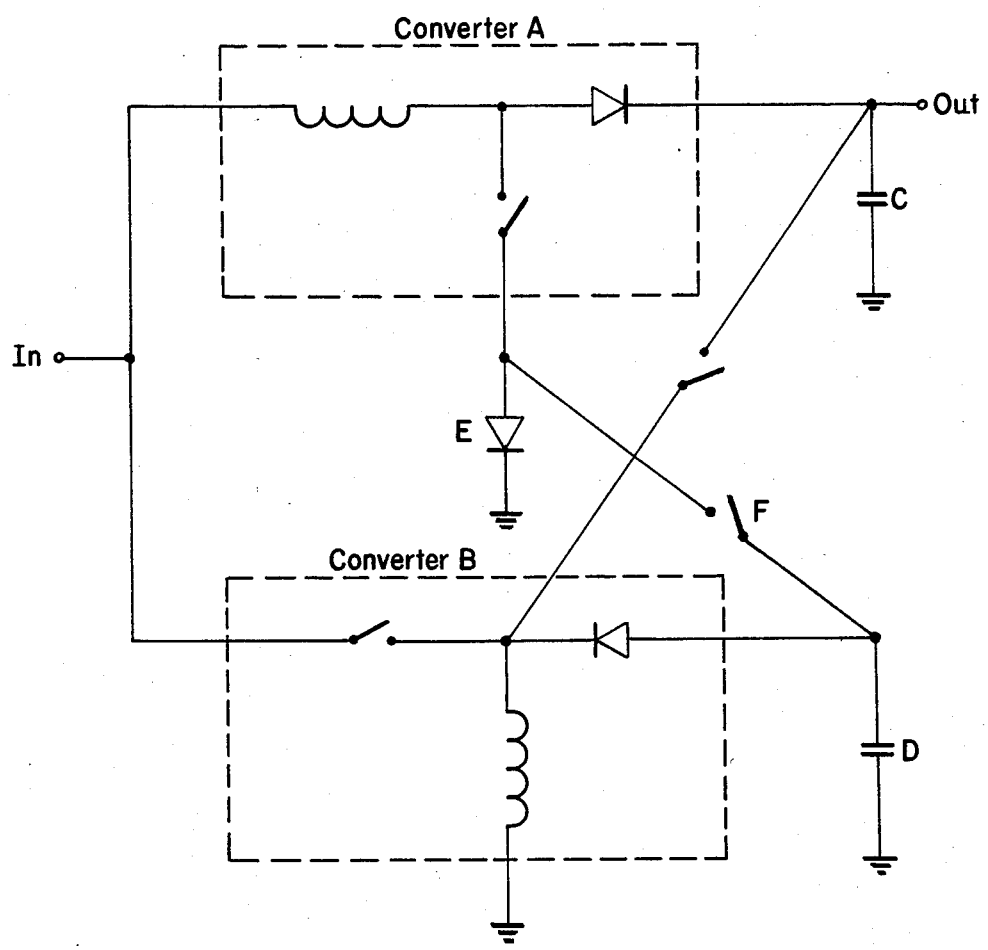
FIG. 2a is an embodiment, based on FIG. 2, with boost converter A, flyback converter B and an additional switch.

The output voltage can be too high however; the capacitor C has been charged too much or the load connected to the output, which for instance has an inductive portion, returns back the received energy. An additional switch can be connected between the common node of the components of the converter B and the output of the converter A as shown in FIG. 2a. In this way, the converter B can provide that the voltage on capacitor C is decreased to a required value. Its ripple is attenuated; no minimum load is necessary.

Figure 2B:
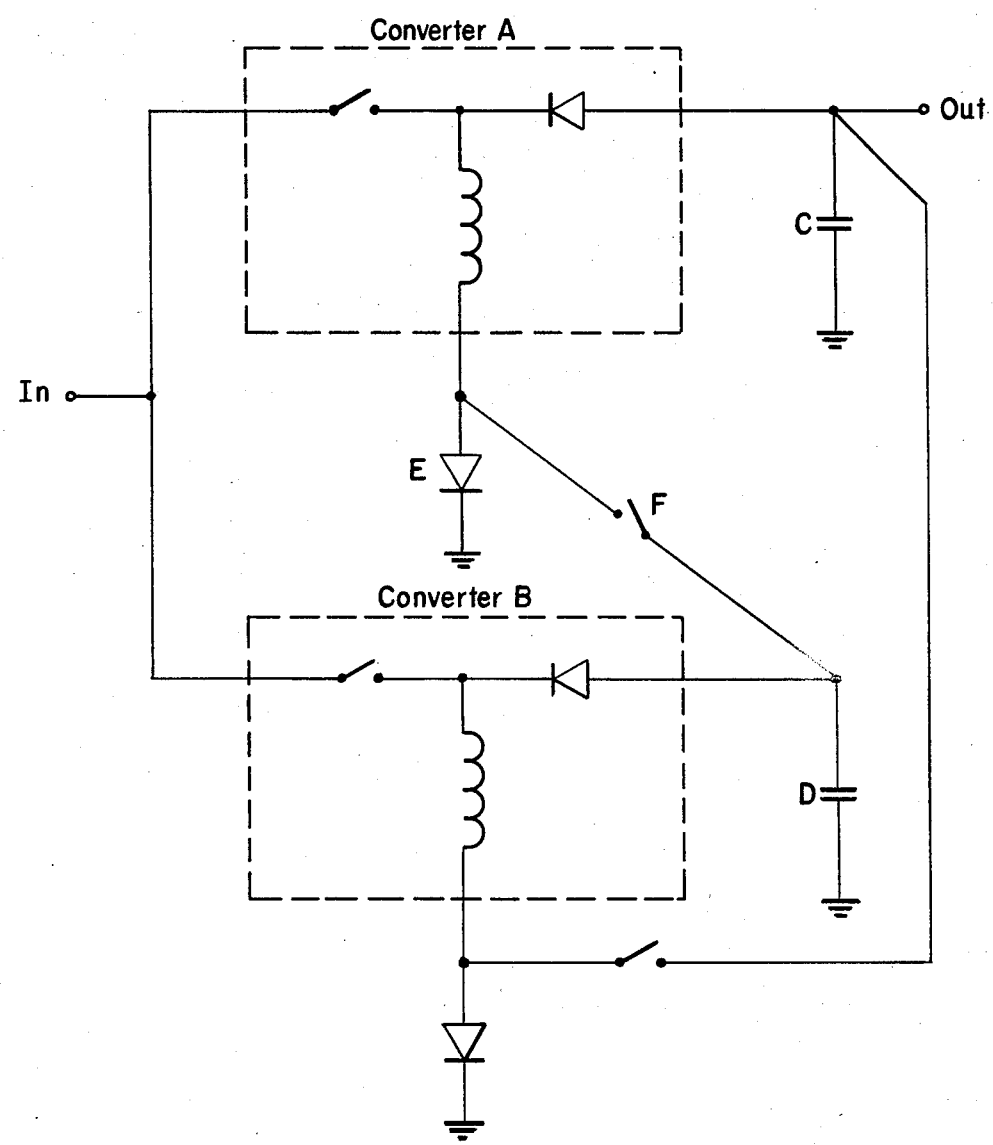
FIG. 2b is an embodiment, based on FIG. 2, with two flyback converters and an additional diode and switch.

An analogous circuit can be provided with a switch in series with the switch of the converter B, as shown in FIG. 2b, similarly to the example with the diode E and the switch F.

Figure 1B:
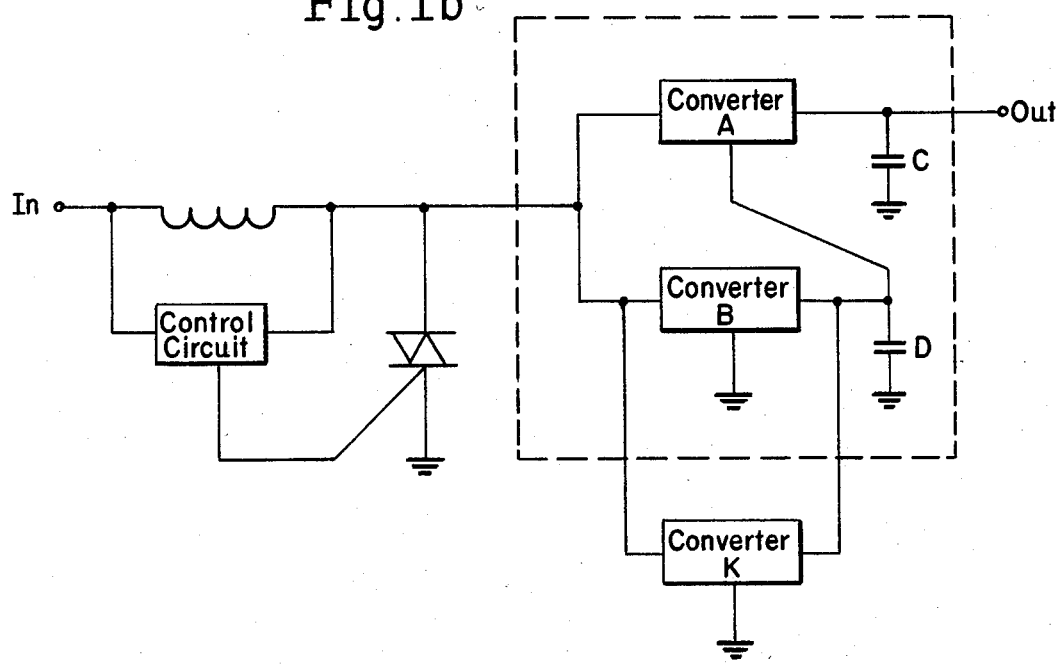
FIG. 1b is an embodiment with an inductor and triac coupled prior to the power supply input, and the converter K coupled in parallel with the converter B.

FIGS. 1 and 2 also have inherent power failure protection. The switches are switched if the line output resistance is high so that the user is supplied with the energy stored in the capacitors C and D. Generally, a two terminal resistive means for an estimate of the input current as well as a switch coupled to ground can be connected at the input of the power supply. Specifically, a resistor or an inductor and a triac can be employed as shown in FIG. 1b. The switch shorts out the inputs of the power supply if the input current is insufficient for a while, i.e. the output resistance of the line is high.

A higher output power can be achieved through a parallel connection of more converters as shown in FIG. 1b.

Figure 3:
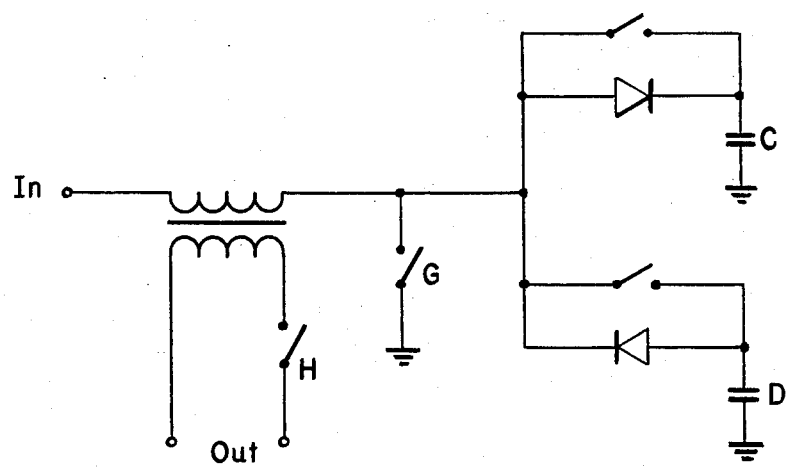
FIG. 3 is a preferred embodiment with two boost converters having common nodes tied together, and based on FIG. 1.

A simplified version of the power supply is FIG. 3. The circuit was formed by connecting the common nodes of the components of the converters A and B. Specifically, there is only one inductor required. The bidirectional switch G replaces two single switches. A triac, if employed here, must only be triggered. It is turned off when one of the remaining switches, depending on the half-wave of the line voltage, is switched on momentarily. The remaining switches also take over the function of the switch G in a range of a zero crossing of the line voltage so that the transformer can pick up the energy at any time.

Adding another inductor magnetically coupled to the first inductor, i.e. by substituting a transformer, line isolation is achieved, and a controllable high frequency AC output signal is provided from the power supply. The user takes the energy over the transformer and, depending on the current direction, one of the capacitors, C or D, is charged. The capacitors can also be discharged independently of the user.

Figure 3A:
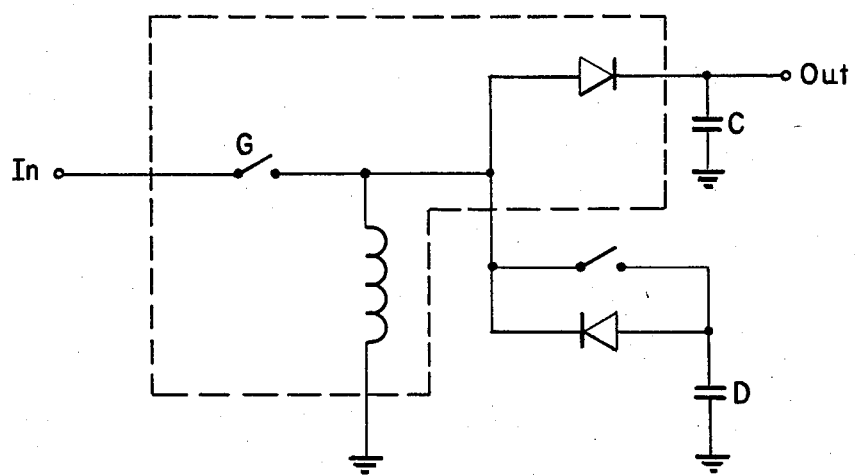
FIG. 3a is an embodiment, based on FIG. 1, with two flyback converters having common nodes tied together.

As mentioned, the above circuits are operable with one or more flyback converters in place of the boost converters. A version of FIG. 3 with two flyback converters is the result when the inductor and the switch G are exchanged as shown in FIG. 3a.

A special advantage of the flyback converter is an opposite polarity of its input and output voltages. The capacitor voltages of the power supply in FIG. 2 with two flyback converters are thus negative. The switch F can be connected from the reference to the output of the converter A. Then, a particularly simple power supply can be obtained by removing the converter B and the capacitor D; it contains only one capacitor. This also results in the basic circuit shown in FIG. 4a.

It has been already pointed out that there is the possibility of the coupling the common nodes of components of the converters A and B and that similarly to the converter A, the reference terminal of the converter B can be connected to ground via a diode and to the output of the converter A via a switch.

FIG. 4 corresponds to the interconnection of common nodes of flyback converters along with connection of the reference terminals to ground via diodes and to respective output terminals via switches. The voltages on the capacitors C and D are negative and positive respectively. The switches of the converter A and B are replaced by the bidirectional switch G, e.g. a transistor with a rectifier bridge. Thyristors can be used as the two remaining switches. The two inductors can be placed on the common core of a transformed in order to achieve the line isolation, thus forming a divided primary winding. A reduction of the current slew rate can be accomplished, as usual, by serial connection of an inductor, in this case, with the centertap of the transformer.

The switching power supply is extremely well suitable for the systems requiring a controllable supply voltage, especially audio amplifiers of a high output power. The power supply is actually also an operative power amplifier. The load, in this case a loudspeaker with an LC-network connected prior thereto, can be coupled directly to the output of the power supply.

The difference is essentially that the output voltage is compared with the audio source signal rather than a fixed reference voltage; the manner of operation is the same. Specifically, the switch H is closed when the magnitude and the polarity of the voltage on the secondary winding of the transformer allows a correction of output voltage on the load. The switching power supply solves thus the tormenting problem of driving an unknown load. The embodiments of the present invention described herein are intended to be taken in an illustrative and not a limiting sense. Various modifications and changes may be made to these embodiments by persons skilled in the art without departing from the scope of the present invention as defined in the appended claims.

What I claim is:

1. Switching power supply, for converting an AC or DC input signal into an output signal, comprising:
   a pair of switching converter means, A and B, each having input, reference and output terminals with the input terminals thereof both being coupled to receive the input signal;
   the reference terminals of switching converter means A and B being connected respectively to the output terminal of switching converter means B and ground; and
   two capacitors, each connected between the output terminal of separate switching converter means and ground with the output terminal of at least one of switching converter means providing the output signal of the power supply.

2. Switching power supply of claim 1, further comprising at least one diode and at least one switch with the reference terminal of at least one of switching converter means being connected to ground via one of the diodes and to the output terminal of one of switching converter means via one of the switches.

3. Switching power supply of claim 1, wherein each of switching converter means includes an inductor, a switch and a diode with each being connected to a common node thereof.

4. Switching power supply of claim 3, wherein at least one of switching converter means is a boost converter with the inductor, switch and diode each also being connected respectively to the input, reference and output terminals thereof.

5. Switching power supply of claim 3, wherein at least one of switching converter means is a flyback converter with the switch, inductor and diode each also being connected respectively to the input, reference and output terminals thereof.

6. Switching power supply of claim 3, further comprising at least one additional switch with the reference terminal of at least one of switching converter means being connected to ground, and the common node thereof being connected to the output terminal of remaining switching converter means via one of the additional switches.

7. Switching power supply of claim 3, further comprising a second and a third switches and a second diode;

the reference terminal of one of switching converter means being connected to ground, and the common node thereof being connected via the second switch to the output terminal of remaining switching converter means; and the reference terminal thereof being connected to ground via the second diode and to the output terminal of one of switching converter means via the third switch.

8. Switching power supply of claim 3, wherein the common nodes of switching converter means A and B are tied together.

9. Switching power supply of claim 3, further comprising a third inductor magnetically coupled to at least one inductor of switching converter means for providing an AC output signal of the power supply.

10. Switching power supply of claim 9, further comprising a fourth switch connected in series with the third inductor for selectively applying the AC output signal.

11. Switching power supply of claim 1, further comprising additional switching converter means having input, reference and output terminals each connected in parallel with one of the first pair of switching converter means.

12. Switching power supply of claim 1, further comprising resistive means for sampling the current flowing therethrough, and switch means, wherein the input terminals of switching converter means A and B receive the input signal through the resistive means and are coupled to ground through switch means, with switch means being closed if the current is below a predetermined value for a certain period of time.

13. Switching power supply for converting an AC or DC input signal into an output signal, comprising:

a converter with an inductor, switch and a first diode, each being connected to a common node and the first diode being also connected to an output terminal, and the inductor and switch also being separately connected to an input and a reference terminals of the converter in either order;

the input terminal being connected to receive the input signal and the reference terminal being connected to ground;

a first capacitor being connected between the output terminal and ground;

a second capacitor having two terminals; and a second diode and a second switch, each being connected to the common node and via the second capacitor to ground, wherein opposite polarity terminals of the first and second diodes are connected to the common node;

wherein the first and second switches are operable independently of each other and the output signal is provided between the output terminal and one of the terminals of the second capacitor.

14. Switching power supply of claim 13, further comprising a third switch connected in parallel with the first diode.

15. Switching power supply of claim 13, further comprising a second inductor magnetically coupled to the first said inductor for providing an AC output signal of the power supply.

16. Switching power supply of claim 15, further comprising a fourth switch connected in series with the second inductor for selectively applying the AC output signal.

17. Switching power supply of claim 13, further comprising resistive means for sampling the current flowing therethrough, and switch means; wherein the input terminal receives the input signal through the resistive means and is coupled to ground through switch means, with switch means being closed if the current is below a predetermined value for a certain period of time.

18. Switching power supply for converting an AC or DC input signal into an output signal, comprising:

a flyback converter with a first switch, an inductor and a first diode each being connected to a common node and also respectively to an input, a reference and an output terminal thereof;

the input terminal being connected to receive the input signal;

a second diode and a second switch;

the reference terminal being connected to ground via second diode and to the output terminal via the second switch wherein like polarity terminals of the first and second diodes are connected to the second switch; and a capacitor being connected between the output terminal and ground, wherein the output terminal provides the output signal of the power supply.

19. Switching power supply of claim 18, further comprising:

a second inductor and a third diode each being connected to the common node of the flyback converter and also respectively to a second reference and a second output terminal;

a fourth diode connecting the second reference terminal to ground; and a second capacitor being connected between the second output terminal and ground wherein opposite polarity terminals of the third and fourth diodes are effectively connected to the second capacitor, wherein the second output terminal provides an additional output signal of the power supply.

20. Switching power supply of claim 19, further comprising a third switch coupled between the second reference terminal and the second output terminal.

21. Switching power supply of claim 18, further comprising a third inductor magnetically coupled to the first said and/or second inductor for providing an AC output signal of the power supply.

22. Switching power supply of claim 21, further comprising a fourth switch connected in series with the third inductor for selectively applying the AC output signal.

23. Switching power supply of claim 18, further comprising resistive means for sampling the current flowing therethrough, and switch means, wherein the input terminal receives the input signal through the resistive means and is coupled to ground through switch means, with switch means being closed if the current is below a predetermined value for a certain period of time.

* * * * *